United States Patent
Bartley et al.

(10) Patent No.: US 10,547,640 B1
(45) Date of Patent: *Jan. 28, 2020

(54) SECURE CRYPTO MODULE INCLUDING ELECTRICAL SHORTING SECURITY LAYERS

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Joseph Kuczynski, North Port, FL (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,615

(22) Filed: Dec. 5, 2018

Related U.S. Application Data

(63) Continuation of application No. 15/048,024, filed on Feb. 19, 2016, now Pat. No. 10,171,498.

(51) Int. Cl.
*H04L 29/06* (2006.01)
*G06F 13/40* (2006.01)

(52) U.S. Cl.
CPC ........ *H04L 63/162* (2013.01); *G06F 13/4068* (2013.01)

(58) Field of Classification Search
CPC ...... G06F 13/4068; G06F 21/88; G06F 21/75; G06F 21/86; G09C 1/00; H04L 63/162; H04L 9/002
See application file for complete search history.

(56) References Cited

U.S. PATENT DOCUMENTS

| | | | |
|---|---|---|---|
| 4,860,351 | A | 8/1989 | Weingart |
| 5,053,992 | A | 10/1991 | Gilberg et al. |
| 5,117,457 | A | 5/1992 | Comerford et al. |
| 5,532,293 | A | 7/1996 | Landis |
| 6,853,093 | B2 | 2/2005 | Cohen et al. |
| 7,005,733 | B2 | 2/2006 | Kommerling et al. |
| 8,589,703 | B2 | 11/2013 | Lee |
| 8,736,286 | B2 | 5/2014 | Johnson |
| 8,752,210 | B2 | 6/2014 | Boday et al. |
| 8,819,842 | B2 | 8/2014 | Boday et al. |
| 10,171,498 | B2* | 1/2019 | Bartley ............... G06F 13/4068 |
| 2001/0033012 | A1* | 10/2001 | Kommerling ........... G06F 21/86 257/679 |

(Continued)

OTHER PUBLICATIONS

List of IBM Patents or Patent Applications Treated as Related, dated herewith.

*Primary Examiner* — Baotran N To
(74) *Attorney, Agent, or Firm* — ZIP Group PLLC

(57) ABSTRACT

A security matrix layer between a first and second conductive shorting layers are located within a printed circuit board (PCB). The security matrix layer includes at least two types of microcapsules with each type of microcapsule containing a different reactant. When the security matrix layer is accessed, drilled, or otherwise damaged, the microcapsules rupture and the reactants react to form at least an electrically conductive material. The electrically conductive material may contact and short the first and second conductive shorting layers.

12 Claims, 7 Drawing Sheets

(56) References Cited

U.S. PATENT DOCUMENTS

| | | |
|---|---|---|
| 2008/0278217 A1 | 11/2008 | Hankofer et al. |
| 2009/0301382 A1 | 12/2009 | Patel |
| 2012/0000810 A1 | 1/2012 | Dry |
| 2013/0179996 A1 | 7/2013 | Boday et al. |

* cited by examiner

US 10,547,640 B1

SECURE CRYPTO MODULE INCLUDING ELECTRICAL SHORTING SECURITY LAYERS

FIELD OF THE INVENTION

Embodiments of the invention generally relate to computer systems and more particularly to computer systems that have a secure crypto module including a first conductive security layer and a second conductive security layer that short upon unauthorized physical access of a security matrix layer.

DESCRIPTION OF THE RELATED ART

A cryptographic module is a set of hardware, software, firmware, or some combination thereof that implements cryptographic logic or cryptographic processes, including cryptographic algorithms, and is contained within the cryptographic boundary of the module. U.S. Government Federal Information Processing Standard (FIPS) 140-2 Security Requirements for Cryptographic Modules-(Level 4) is a standard that specifies security requirements for cryptographic modules. This standard requires that physical security mechanisms provide a complete envelope of protection around the cryptographic module with the intent of detecting and responding to all unauthorized attempts at physical access.

A non-exhaustive list of a cryptographic modules is as follows: cryptographic coprocessor, cryptographic accelerator, cryptographic adapter card, cryptographic field programmable gate array (FPGA), memory storing cryptographic accelerator data, etc.

In a particular example of a cryptographic module, a cryptographic coprocessor is a secure cryptoprocessor that performs cryptographic operations used by application programs and by data handling operations, such as SSL (Secure Sockets Layer) private key transactions associated with SSL digital certificates. The cryptoprocessor includes a tamper-responding hardware security module that provides secure storage for storing crypto keys and other sensitive data. Cryptoprocessor applications may include financial PIN (Personal Identification Number) transactions, bank-to-clearing-house transactions, EMV (Europay®, MasterCard®, and Visa®) transactions for integrated circuit (chip) based credit cards, basic SET (Secure Electronic Transaction) block processing, and general-purpose cryptographic applications using symmetric key, hashing, and public key algorithms. The crypto keys may be generated in the cryptoprocessor and may be saved in a keystore file encrypted under a master key of that cryptoprocessor.

In another particular example of a cryptographic module, a cryptographic adapter card includes a printed circuit board that may be plugged into a computer system motherboard. The cryptographic adapter card includes a secure crypto module that contains and generally forms a boundary to one or more other cryptographic modules contained therein forming the envelope of protection around the one or more other cryptographic module(s). Secure crypto modules typically include tamper sensors that detect and respond to unauthorized attempts at physical access.

SUMMARY

In an embodiment of the present invention, a printed circuit board is presented. The printed circuit board includes a first conductive layer, a second conductive layer, and a security matrix layer between the first conductive layer and the second conductive layer. The security matrix layer includes first microcapsules and second microcapsules. The first microcapsules include therein a first reactant and the second microcapsules include therein a second reactant different than the first reactant. An electrically conductive material is formed by the first reactant chemically reacting with the second reactant.

In another embodiment of the present invention, a data handling electronic device is presented. The data handling electronic device includes a first conductive layer, a second conductive layer, and a security matrix layer between the first conductive layer and the second conductive layer. The security matrix layer includes first microcapsules and second microcapsules. The first microcapsules include therein a first reactant and the second microcapsules include therein a second reactant different than the first reactant. An electrically conductive material is formed by the first reactant chemically reacting with the second reactant.

These and other embodiments, features, aspects, and advantages will become better understood with reference to the following description, appended claims, and accompanying drawings.

DETAILED DESCRIPTION

A security matrix layer between a first and second conductive shorting layers is utilized by a cryptographic adapter card that includes one or more secured crypto components that carry out cryptographic data handling functions. The security matrix layer and conductive shorting layers may be located upon a PCB of a crypto adapter card or upon a daughter card within a secure crypto module upon the crypto adapter card. The crypto adapter card may be installed within a computer system that performs cryptographic functions utilizing one or more secured crypto components. The security matrix layer includes at least two microcapsules each containing one or more reactants. When the security matrix layer is accessed, drilled, or otherwise damaged, the microcapsules rupture and the reactants react to form at least an electrically conductive compound. The electrically conductive compound contacts and shorts the first and second conductive shorting layers. A monitoring device that monitors the impedance between the first and second conductive shorting layers detects the short and passes a tamper signal that is received by one or more computer system devices to respond to the unauthorized attempt of physical access. For example, one or more cryptographic adapter card or computer system functions or secured crypto components may be disabled.

The term short, electrical short, or the like means a predetermined threshold change in resistance across respective shorting layers with respect to time zero, exceeding or not meeting a predetermined threshold resistance across respective shorting layers, and/or that current travels along the unintended path to/from the first shorting layer from/to the second shorting layer encountering less than a predetermined impedance.

Figure 1:
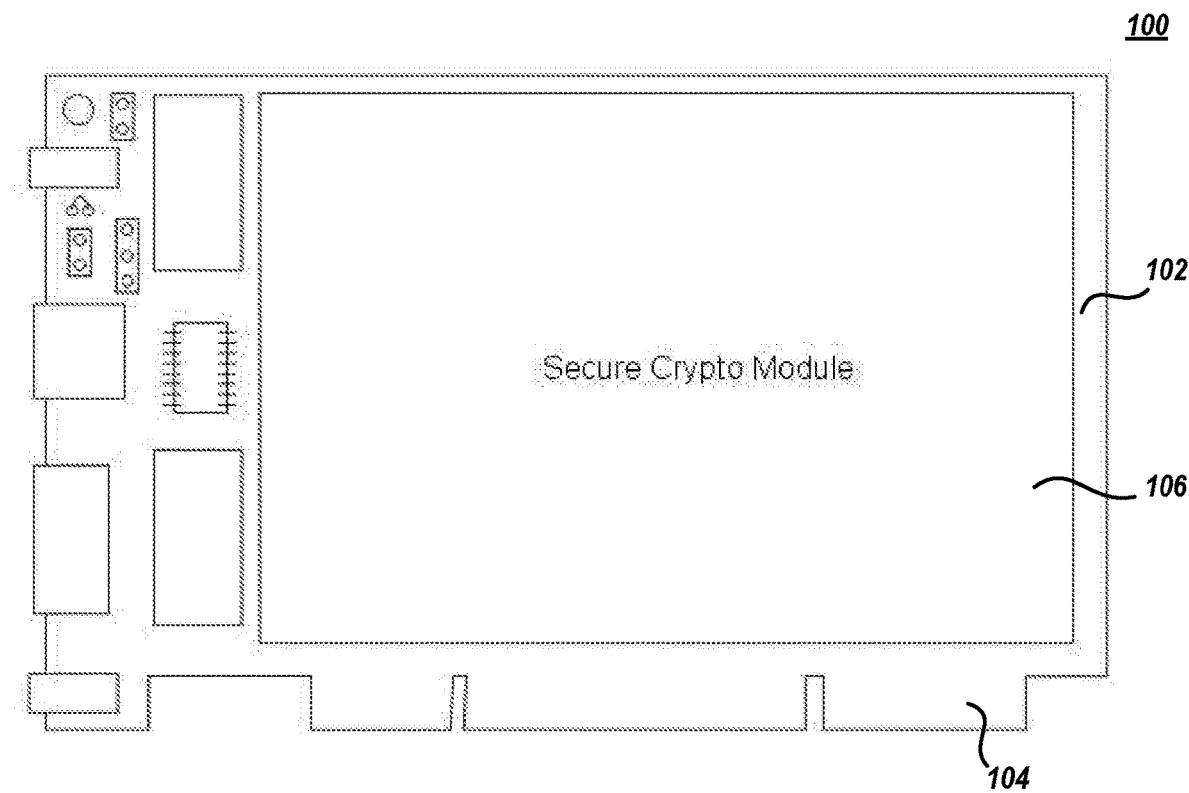
FIG. 1 illustrates an exemplary cryptographic adapter card including a secure crypto module that utilize various embodiments of the present invention.

Referring to the Drawings, wherein like numbers denote like parts throughout the several views, FIG. 1 illustrates a cryptographic adapter card 100 that includes a secure crypto module 106. Cryptographic adapter card 100 includes a printed circuit board (PCB) 102 and connector 104 that can be inserted into an electrical connector, or expansion slot on a computer motherboard, backplane or riser to add functionality to the computer via an expansion bus. PCB 102 provides mechanical support for various electronic components as well as conductive pathways to provide for electrical communication (e.g., data transfer, etc.) therebetween and to and from the motherboard. The computer motherboard, backplane or riser, hereinafter referred to as a motherboard, provides mechanical support for computer components such as a processor and memory and provides conductive pathways to provide for electrical communication to and from the computer components. The expansion bus, a particular conductive pathway, is a computer bus which moves information between the internal hardware of the computer (e.g., the processor and memory) and peripheral devices.

Figure 2:
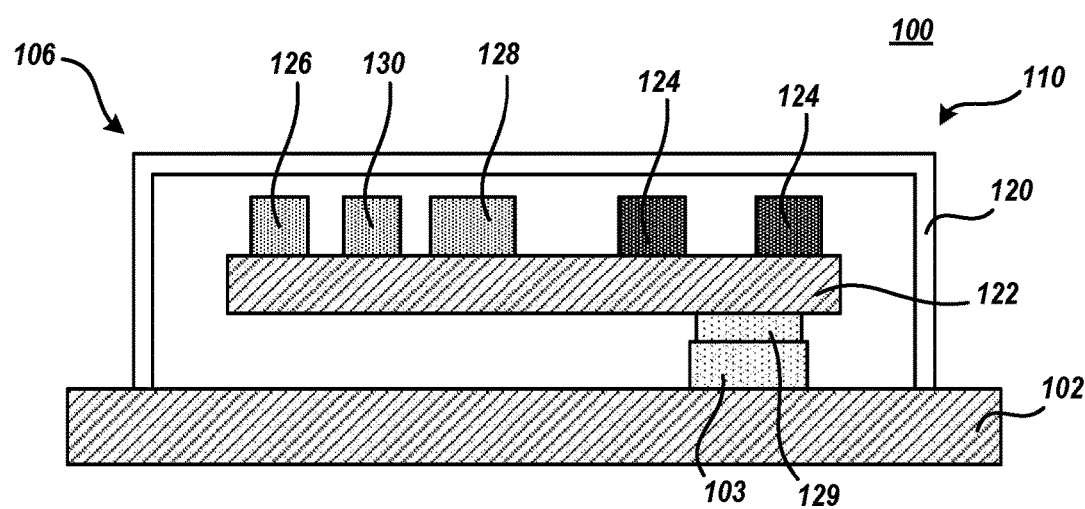
FIG. 2 illustrates an exemplary cross section of an exemplary cryptographic adapter card that includes a cryptographic printed circuit board (PCB) module, according to various embodiments of the present invention.

Secure crypto module 106 provides a complete envelope of protection around a cryptographic PCB module 110, exemplarily shown in FIG. 2, to detect and respond to unauthorized attempts at physical access or tampering therewith.

FIG. 2 illustrates an exemplary cross section of cryptographic adapter card 100. Secure crypto module 106 includes cryptographic PBC module 110 and shield 120. Cryptographic module 110 is a collective set of hardware that physically resides upon or imbedded within daughter PCB 122 or is software, firmware, etc. called by that hardware that which implements cryptographic logic or cryptographic processes, including cryptographic algorithms, and is contained within the boundary or shield 120 of the secure crypto module 106.

As is further described herein, PCB 102 and/or daughter PCB 122 includes a security matrix layer between shorting conductive layers that detects unauthorized physical access attempts thereto. The security matrix layer and shorting conductive layers, which may be referred to collectively hereafter as the security layers, may be located in various locations within the PCB layer buildup. For example, the security layers may be nearest the PCB upper surface or lower surface, or may alternatively be located within the PCB. Damage to the matrix layer results in conductive material released therefrom that shorts the shorting conductive layers. The short of the shorting conductive layers may be detected and may result in the zeroization of area(s) of the one or more crypto components 124 where sensitive data is stored, disabling of the one or more crypto components 124, etc.

Cryptographic module 110 includes a daughter PCB 122 and one or more crypto devices 124. Cryptographic module 110 may further include battery 126, enable device 128, connector 103, connector 129, and monitor device 130. Daughter PCB 122 provides mechanical support for crypto devices 124 and for battery 126, enable device 128, and monitor device 130 when included within cryptographic module 110. Daughter PCB 122 includes electrical traces or pathways therein that provide for the connection of one or more crypto devices 124 to other electrical devices upon the daughter PCB 122, upon PCB 102, and/or upon the computer system motherboard, etc. Connector 129 generally electrically connects the daughter PCB 122 to PCB 102 via PCB connector 103.

The various connectors and conductive pathways contemplated herein generally allow for crypto devices 124 to electrically communicate with one or more computer components of the motherboard. When cryptographic adapter card 100 is not connected to the motherboard (where electrical potential is provided therefrom), battery 126 provides electric potential to enable device 128 to program or enable a destruct feature within each crypto device 124. The battery 126 may further provide backup power to one or more features of the cryptographic module 110 and may be active from the time of factory initialization until the end of the cryptographic module 110 expected product life.

Crypto devices 124 are hardware computer components that implement cryptographic logic or cryptographic processes or otherwise store or handle cryptographic data. A non-exhaustive list of crypto devices 124 are a coprocessor, memory (DRAM, Flash, ROM, RAM, etc.), FPGA, etc.

Shield 120 is an enclosure, chassis, envelope, or other shell that generally surrounds and protects the internal cryptographic module 110. Shield 120 may be absent of access or air flow cutouts to limit access to the internal cryptographic module 110. In some implementations where a crypto component 124 may be cooled, a heat sink may be thermally attached to the crypto component 124 and the fins or pins of the heat sink may protrude through the shield 120. In an embodiment, shield 120 may surround the cryptographic module 110 on at least five sides, the sixth side of cryptographic module 110 being protected by the printed circuit board 102. In another embodiment, shield 120 may surround the cryptographic module 110 on all six sides of the cryptographic module 110 with the sixth side including a cutout to allow the daughter PCB 122 to be electrically connected to PCB 102 via connects 129, 103. In embodiments, the shield 120 may be formed from sheet metal. By surrounding the internal cryptographic module 110, shield 120 generally protects the cryptographic module 110 by limiting physical penetration thereto.

Though shown in FIG. 2 generally as surface mount components, pin-in-hole components, socketed components, circuits, etc. upon daughter PCB 122, crypto component 124, battery 126, enable device 128, and/or monitor device 130 may alternatively be imbedded within daughter PCB 122. For example, monitor device 130 may be an impedance, resistance detection circuit, or the like, imbedded within daughter PCB 122. Similarly, one or more of the crypto component 124, battery 126, enable device 128, and/or monitor device 130 shown in physical association with daughter PCB 122 may be physically located upon or imbedded within PCB 102.

Figure 3:
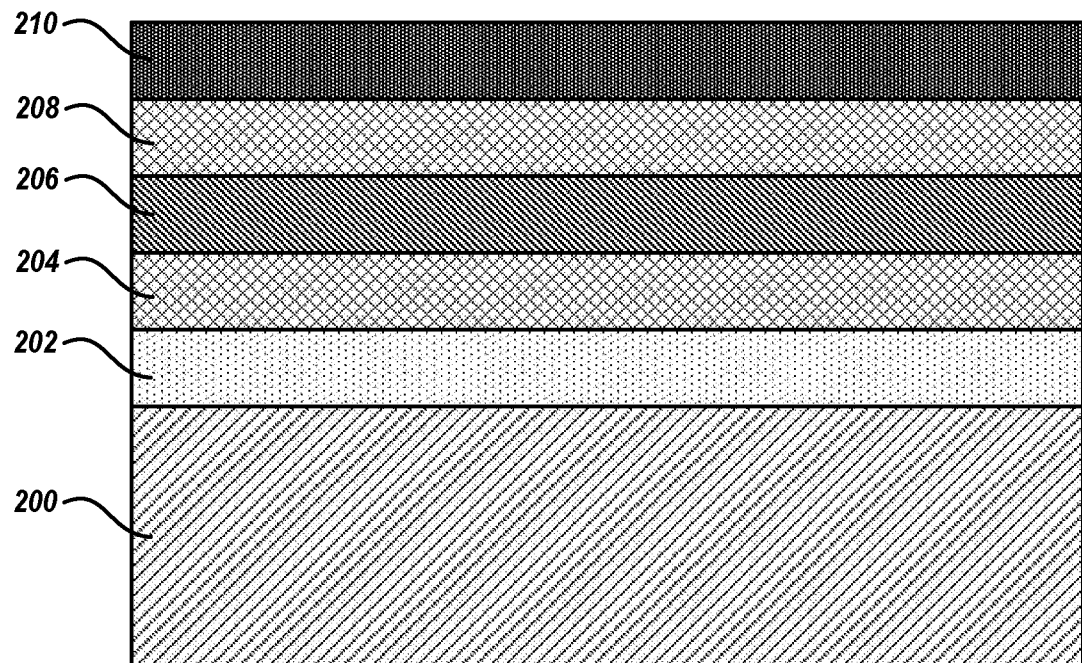
FIG. 3 illustrates an exemplary cross section view of a cryptographic adapter card PCB or a daughter PCB of the cryptographic PCB module, according to various embodiments of the present invention.

FIG. 3 illustrates an exemplary cross section view of cryptographic adapter card PCB 102 or daughter PCB 122 including the security layers, according to various embodiments of the present invention. In a particular implementation of the cryptographic adapter card 100, only the PCB 102 and not daughter PCB 122 includes the security layers. In another implementation of the cryptographic adapter card 100, only the daughter PCB 122 and not PCB 102 includes the security layers. In yet another implementation of the cryptographic adapter card 100, both the PCB 102 and daughter PCB 122 include respective security layers. In a particular embodiment, as is shown in FIG. 3, the security layers are formed upon an upper surface of the PCB. In other embodiments, the security layers are formed upon a lower surface of the PCB. Still, in other embodiments, the security layers are formed upon the upper and lower surfaces of the PCB.

The PCB may include wiring layer(s) 200, encapsulation layer 202, conductive security layer 204, security matrix layer 206, conductive security layer 208, and/or coating layer 210.

Wiring layer(s) 200 are the traditional wiring buildup of PCBs and may include conductive traces formed upon one or more layers of dielectric substrate. The conductive traces may be formed, e.g, by etching. copper sheets that are laminated onto a dielectric substrate layer (e.g. prepreg, FR4, etc.), by plating, printing, etc. conductive material upon the dielectric substrate layer, etc. The dielectric substrates are usually dielectric composite materials that contain a matrix, e.g. an epoxy resin and a reinforcement, e.g., a woven, sometimes nonwoven, glass fabric. An additional wiring layer may be formed by laminating a second dielectric substrate upon the conductive traces and first dielectric substrate and second layer of conductive traces formed thereupon. Conductive traces on different layers may be connected with plated-through hole vias, blind vias, buried vias, etc. Components such as capacitors, resistors, active devices, crypto component 124, battery 126, enable device 128, and/or monitor device 130 may be imbedded within and connected to, formed by, etc. conductive traces within wiring layers(s) 200. Conductive traces may be electrically connected to these components by known interconnection techniques.

Encapsulation layer 202 is formed upon the wiring layer(s) 200. In some instances, encapsulation layer 202 may be a known resin that is a conforming material coated upon the wiring layers 200 that conforms to the contours of the PCB. As is known in the art, the resin may be visually opaque. The encapsulation layer 202 may generally protect the wiring layer(s) 200 against moisture, dust, chemicals, and temperature extremes that, if uncoated (non-protected), could result in damage or failure of the electronics mounted upon or imbedded within wiring layer(s) 200 to function. The encapsulation layer 202 may be formed from by known fabrication techniques and may be formed from an epoxy, polyurethane, resin, silicon, or the like, material. Encapsulation layer 202 may have a thickness greater than the height of PCB 102, 122 surface features. For example, encapsulation layer 202 has a thickness greater than the height of capacitors, resistors, active devices, crypto component 124, battery 126, enable device 128, and/or monitor device 130 located upon the PCB 102 or daughter card 122.

Conductive security layer 204 is an electrically conductive sheet, plane, or the like that is formed upon encapsulation layer 202. The conductive security layer 204 may be a copper layer laminated to encapsulation layer 202. The conductive security layer 204 may be the same type of copper sheet utilized to form conductive traces within wiring layer 200. The conductive security layer 204 may also be deposited, plated, grown, etc. upon encapsulation layer 202. For example, silver or any electro-deposited or plated conductive material commonly used in PCB manufacturing may be formed upon encapsulation layer 202. In another embodiment, layer 204 may take the form of a conductive path or trace that is located upon at least the majority of the surface of encapsulation layer 202 and may be, e.g., conductive paths formed from etching the layer 204, yet can also be e.g., electro-deposited conductive paths formed directly upon layer 204.

The conductive security layer 204 is generally similar in length and width relative to the underling wiring layer(s) 200. For example, the conductive security layer 204 side surfaces (left and right surfaces as shown in FIG. 3) and front and rear surfaces (surfaces into and out of the page as shown in FIG. 3) are coincident with associated surfaces of the wiring layer(s) 200. The conductive security layer 204 is electrically connected to monitor device 130. For example, when monitor device 130 is imbedded within wiring layer(s) 200, a plated through hole via may connect a first conductive trace that is electrically connected to monitor device 130 with conductive security layer 204.

Security matrix layer 206 is a layer that includes at least two types of microcapsules located within a supporting material. A microcapsule is a hollow micrometer scale particle composed of a solid shell surrounding a reactant. A first type of microcapsule includes a first reactant and the second type of microcapsule includes a second reactant. When the security matrix layer 206 is accessed, the first type and second type of microcapsules rupture exposing the first reactant with the second reactant. When combined, the first reactant and the second reactant form at least an electrically conductive material.

A third microcapsule type may contain a resin and a fourth microcapsule type may contain a hardener that upon the third and fourth microcapsule type rupturing, react to form a self-healing material that would fill the hole 220, cut, trench, generally referred to as a void, to prevent the probing or access to the PCB 102, 122 therethough. Unless otherwise indicated, the term "void" shall mean space created from the removal or displacement of material.

The various microcapsules may be randomly located within the supporting material, dispersed within the supporting material, randomly positioned in a three dimensional matrix within the supporting material, etc.

In a particular embodiment, the first reactant may be a low molecular weight aldehyde (e.g., acetaldehyde, ethanal, propanal, etc.). The second reactant may be another Tollens' reagent. Tollens' reagent is a chemical reagent used to determine the presence of an aldehyde or alpha-hydroxy ketone functional group. The reagent consists of a solution of silver nitrate and ammonia. When the first and second microcapsules rupture, as a result of unauthorized physical access of security matrix layer 206, the Tollens' reagent reacts with the aldehyde to form a corresponding carboxylic acid and metallic silver.

In another embodiment, the security matrix layer 206 includes additional microcapsule types that contain materials, chemicals, compounds, etc., respectively, that when ruptured react to self-heal or otherwise fill the void of the security matrix layer 206. For example, a microcapsule may contain a resin and another microcapsule may contain a hardener that upon microcapsule rupture, react to form a self-healing material that would fill the void of the security matrix layer 206 prior to additional unauthorized probing, accesses, etc. attempts of security matrix layer 206.

The security matrix layer 206 is generally similar in length and width relative to the underling wiring layer(s) 200. For example, the security matrix layer 206 side surfaces (left and right surfaces as shown in FIG. 3) and front and rear surfaces (surfaces into and out of the page as shown in FIG. 3) are coincident with associated surfaces of the wiring layer(s) 200.

The supporting material may be thermosetting polymer (or plastic). In this embodiment, security matrix layer 206 may be formed by mixing in the first type of microcapsules and second type of microcapsules with the raw polymer pellets and e.g. extruded, molded, or otherwise formed. The microcapsules are selected such that they will survive the supporting material forming process, i.e., one would select the microcapsule shell wall to be thermally stable at the extrusion temperatures required for the polymer film. The resulting polymer/microcapsule layer is bonded to conductive security layers 204, 208 using conventional techniques.

The supporting material may also be PCB dielectric layer. In this embodiment, the microcapsules are incorporated into epoxy resins used to form the PCB dielectric layer. The microcapsule and resin mixture is then used to impregnate glass cloth. The microcapsule epoxy resin is partially cured at mild temperatures and the microcapsules remain. This resulting PCB dielectric layer is bonded to conductive security layers 204, 208 using conventional techniques.

Conductive security layer 208 is an electrically conductive sheet, plane, or the like that is formed upon security matrix layer 206. The conductive security layer 208 may be a copper layer laminated upon security matrix layer 206. The conductive security layer 208 may be the same type of copper sheet utilized to form conductive traces within wiring layer(s) 200. The conductive security layer 208 may also be deposited, plated, grown, etc. upon security matrix layer 206. For example, silver or any electro-deposited or plated conductive material commonly used in PCB manufacturing may be formed upon security matrix layer 206. In another embodiment, layer 208 may take the form of a conductive path or trace that is located upon at least the majority of the surface of security matrix layer 206 and may be, e.g., conductive paths formed from etching the layer 208, yet can also be e.g., electro-deposited conductive paths formed directly upon layer 206.

The conductive security layer 208 may or may not be the same type of layer or same type of material as conductive security layer 204. The conductive security layer 208 is generally similar in length and width relative to the underling wiring layer(s) 200. For example, the conductive security layer 208 side surfaces (left and right surfaces as shown in FIG. 3) and front and rear surfaces (surfaces into and out of the page as shown in FIG. 3) are coincident with associated surfaces of the wiring layer(s) 200. The conductive security layer 208 is electrically connected to monitor device 130. For example, when monitor device 130 is imbedded within wiring layer(s) 200, a plated through hole via may connect a second conductive trace that is electrically connected to monitor device 130 with conductive security layer 208. Generally, the conductive security layer 204 and conductive security layer 208 are normally electrically insulated from each other. For example, security matrix layer 206 electrically insulates conductive security layer 204 from conductive security layer 208. Further, any traces or other electrical conductors electrically connected to security matrix layer 206 are likewise electrically insulated from any traces or other electrical conductors electrically connected to conductive security layer 204.

Coating layer 210 is formed upon conductive security layer 208. In some instances, coating layer 210 may be a known resin that is a conforming material coated upon the security layer 208 that conforms to the contours of security layer 208. As is known in the art, the resin may be visually opaque. The coating layer 210 may generally protect the security layer 208 against moisture, dust, chemicals, and temperature extremes that, if uncoated (non-protected), could result in unintentional damage to underlying layers or components. In an embodiment, coating layer 210 may be a similar or different material relative to encapsulation layer 202.

Figure 4:
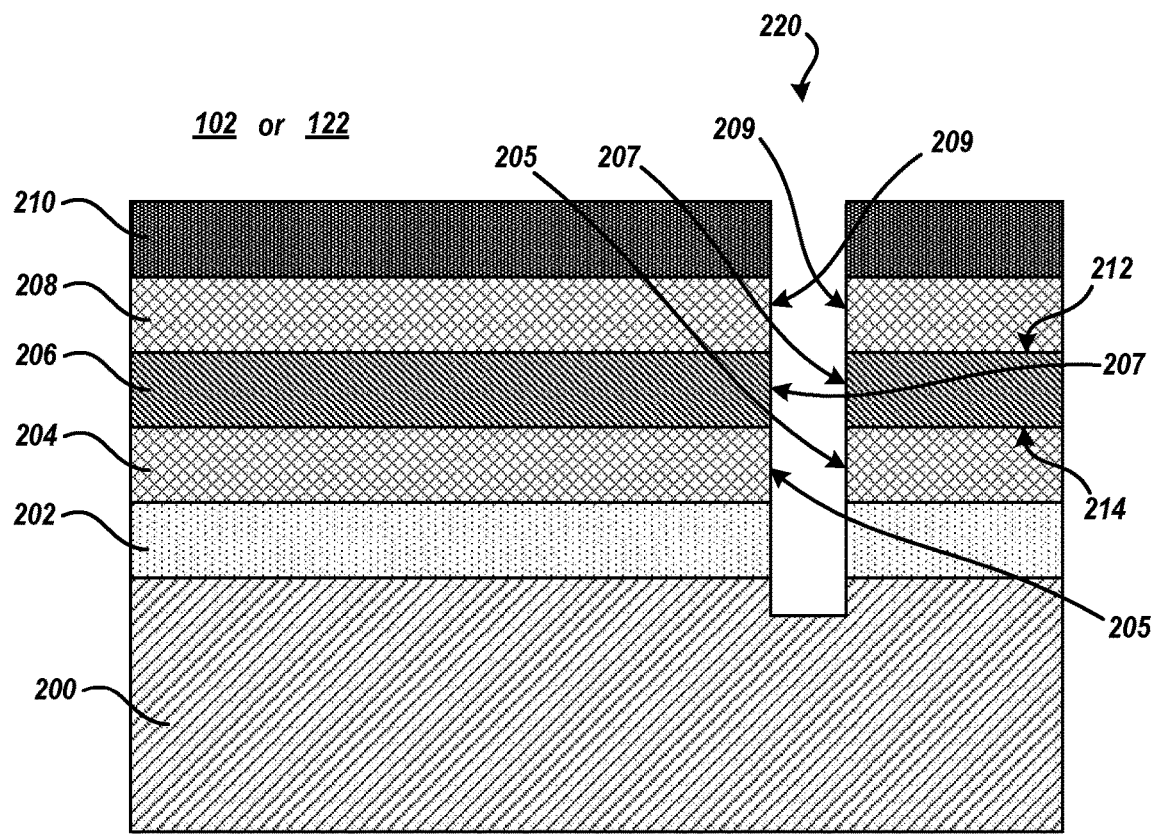
FIG. 4 illustrates an exemplary cross section view of the cryptographic adapter card PCB or the daughter PCB subsequent to an unauthorized physical access thereto, according to various embodiments of the present invention.

FIG. 4 illustrates an exemplary cross section view of the cryptographic adapter card PCB 102 or the daughter PCB 122 subsequent to an unauthorized physical access thereto, according to various embodiments of the present invention. The physical access of PCB depicted in FIG. 4 results in a void, such as hole 220, such as a saw trench, drill hole, etc. within the PCB. The void or hole 220 extends past a top surface 212 and at least past bottom surface 214 of security matrix layer 206 thereby exposing hole-created sidewalls 209 of conductive security layer 208 and at least partially exposing hole-created sidewalls 205 of conductive security layer 204. The void or hole 220 may extend through coating layer 210, security layer 208, security matrix layer 206, security layer 204, encapsulation layer 202, and at least partially into wiring layer 200 of PCB 102, 122, as is exemplarily shown in FIG. 4. The void or hole 220 may be the result of an unauthorized attempt to access, probe, etc. a particular trace within wiring layer(s) 200 in order to reverse engineer cryptographic functions carried out by PCB 102, 122, etc.

Figure 5:
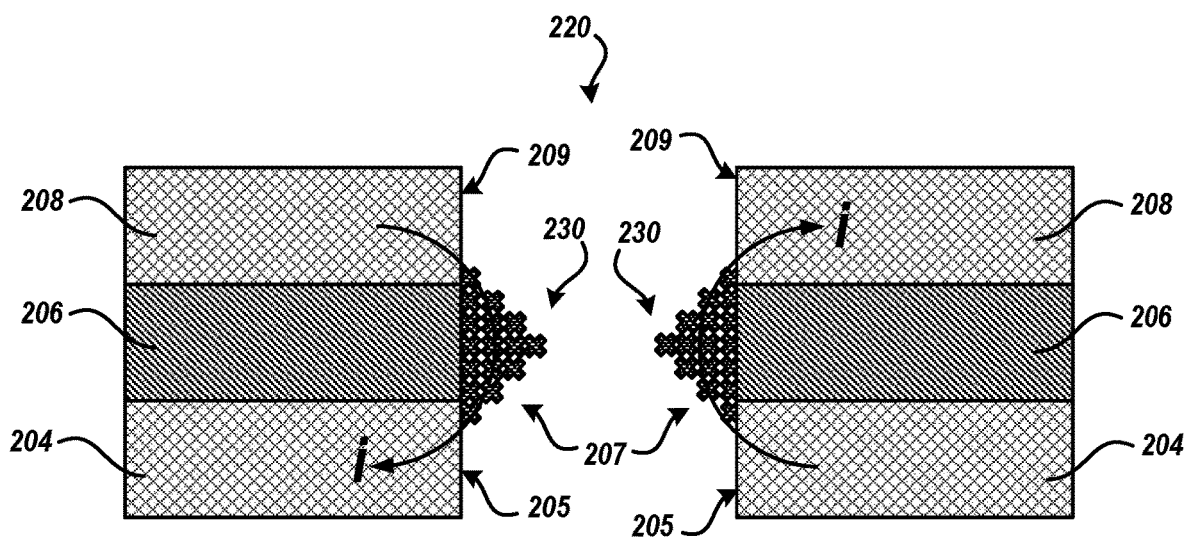
FIG. 5-FIG. 6 illustrate exemplary cross section views of a security matrix layer and conductive shorting layers subsequent to an unauthorized physical access thereto, according to various embodiments of the present invention.

FIG. 5 illustrates an exemplary cross section view of security matrix layer 206 and conductive shorting layers 204, 208, subsequent to an unauthorized physical access thereto, according to various embodiments of the present invention. Upon an unauthorized physical access of security matrix layer 206, conductive security layer 204 is electrically connected (or shorted) with conductive security layer 208 by the electrically conductive material 230 formed by the reaction of the first and second microcapsule reactants within the security matrix layer 206. Electrically conductive material 230 is at least a partial product of reactants within respective first microcapsules and second microcapsules reacting upon the first microcapsules and second microcapsules being punctured or ruptured by the process of creating or forming the void or hole 120.

Electrically conductive material 230 is released from the security matrix layer 206 surface 207 exposed by void or hole 220. The electrically conductive material 230 contacts conductive shorting layer 204 by forming upon or otherwise contacting surface 205 exposed by the void or hole 220. Likewise, electrically conductive material 230 contacts conductive shorting layer 208 by forming upon or otherwise contacting surface 209 exposed by the void or hole 220. As such, electrically conductive material 230 electrically shorts conductive shorting layers 204, 208. Therefore, upon the formation of electrically conductive material 230, electrical current may flow from conductive shorting layer 204 to conductive shorting layer 208 or from conductive shorting layer 208 to conductive shorting layer 204 via electrically conductive material 230.

Figure 6:
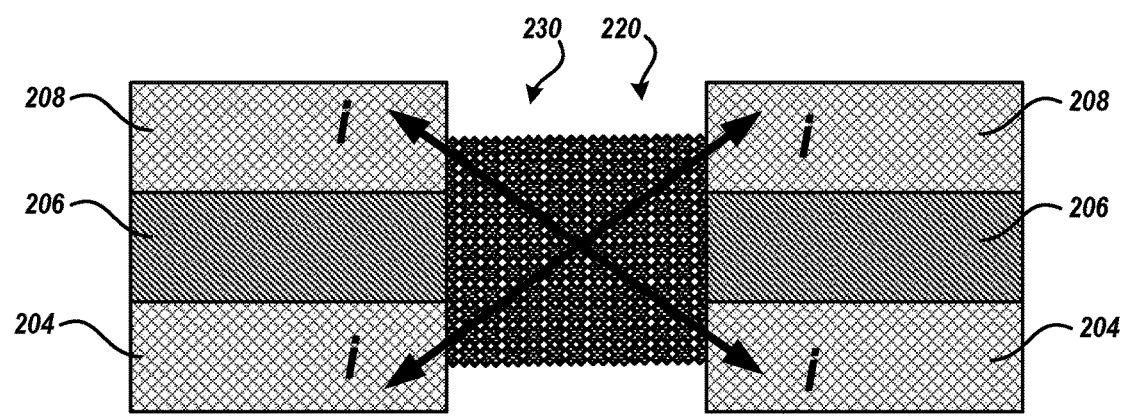

FIG. 6 illustrates an exemplary cross section view of security matrix layer 206 and conductive shorting layers 204, 208, subsequent to an unauthorized physical access thereto, according to various embodiments of the present invention. FIG. 6 generally depicts electrically conductive material 230 generally filling hole 220.

Figure 7:
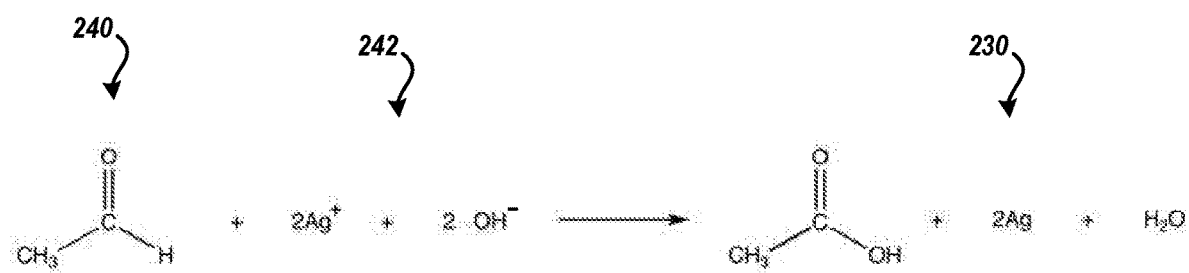
FIG. 7 illustrates a reaction of reactants within the security matrix layer subsequent to an unauthorized physical access thereto, according to various embodiments of the present invention.

FIG. 7 illustrates a reaction of exemplary reactants within the security matrix layer 206 subsequent to an unauthorized physical access thereto, according to various embodiments of the present invention. In the depicted embodiment, the first reactant located in first microcapsules within security matrix layer 206 is an aldehyde 240 and the second reactant located in second microcapsules within security matrix layer 206 is Tollens' reagent 242. The aldehyde 240 depicted in FIG. 7 may be formed by the oxidation of ethylene, as is known in the art. The particular Tollens' reagent 242 depicted in FIG. 7 may be formed by first mixing aqueous silver nitrate with aqueous sodium hydroxide and second adding aqueous ammonia until the precipitated silver oxide completely dissolves, as is known in the art. The aldehyde 240 and Tollens' reagent 242 are encapsulated by respective microspheres, as is known in the art. The respective microspheres are added to the raw material(s) that form the thermosetting polymer of security matrix layer 206. The resulting security matrix layer 206 therefore includes the polymer with respective microspheres dispersed therein. The material and thickness of the microsphere wall is preferably strong and/or resilient enough to withstand the thermosetting fabrication stages to form the polymer of security matrix layer 206. In other words, the microsphere should stay intact (i.e. not rupture) during security matrix layer 206 fabrication.

The respective microspheres are ruptured upon the unauthorized access of security matrix layer 206 thereby exposing, expelling, releasing, or the like, aldehyde 240 and Tollens' reagent 242. Upon aldehyde 240 and Tollens' reagent 242 meeting, the Tollens' reagent 242 oxidizes aldehyde 240 into the corresponding carboxylic acid and metallic silver. In the particular example depicted in FIG. 7, the metallic silver is the electrically conductive material 230 that is formed from the exposed security matrix layer 206 surfaces and shorts conductive shorting layers 204, 208. For clarity, unless otherwise indicated, the material(s) within the first microcapsule and second microcapsule are not limited to aldehyde 240 and Tollens' reagent 242, respectively, and may be different material(s) that react to produce electrically conductive material 230.

The security matrix layer 206 may also includes additional microcapsule types that contain materials, chemicals, compounds, etc., respectively, that when ruptured react to self-heal or otherwise fill the hole 220. For example, a third microcapsule type may contain a resin and a fourth microcapsule type may contain a hardener that upon microcapsule rupture, react to form a self-healing material that would fill the hole 220 to prevent the probing or access to the PCB 102, 122 therethough.

Figure 8:
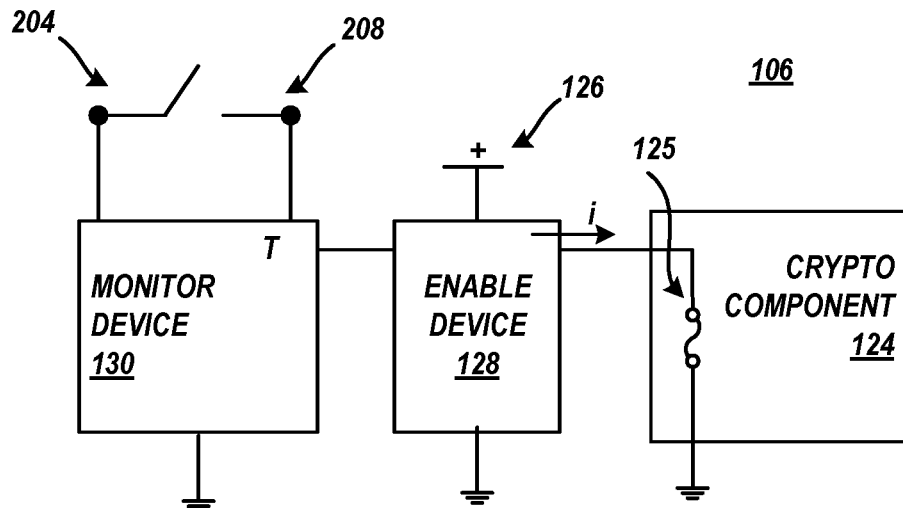
FIG. 8 illustrates a block circuit diagram of a secure crypto module that utilizes various embodiments of the present invention.

FIG. 8 illustrates an exemplary block circuit diagram of secure crypto module 106 that utilizes various embodiments of the present invention. Monitor device 130 is electrically connected to conductive shorting layer 204 and electrically connected to conductive shorting layer 208. Further, monitor device 130 is communicatively connected to enable device 128 in that it may communicate a tamper signal from monitor device 130 to enable device 128. Monitor device 130 is an electrical component or circuit that measures or otherwise determines if a short exists between conductive shorting layer 204 and conductive shorting layer 208. In various embodiments, monitor device 130 may be an application specific integrated circuit (ASIC), field programmable gate array (FPGA), etc.

Monitor device 130 continuously, periodically, etc. determines whether conductive shorting layer 204 is electrically connected to conductive shorting layer 208. Since conductive shorting layer 204 is not configured to be electrically connected to conductive shorting layer 208 in normal operation, such electrical connection is deemed a short.

Monitor device 130 may also generate and send an enable signal to an intermediary device, such as enable device 128 or directly to crypto component 124 upon monitor device 130 determining that conductive shorting layer 204 is electrically connected to conductive shorting layer 208. For example, a default signal generated and sent from monitor device 130 to enable device 128 may be a low "0" signal. Upon the monitor device 130 detecting conductive shorting layer 204 is electrically connected to conductive shorting layer 208, the enable signal is generated and sent from monitor device 130 to enable device 128 as a high "1" signal indicating that security matrix layer 206 has been accessed and conductive material 230 has shorted conductive shorting layer 204 and conductive shorting layer 208.

Enable device 128 has or is connected to electrical potential and connected to a destruct feature 125 within crypto component 124. The electrical potential may be the power supply of cryptographic adapter card PCB 122 or motherboard PCB 102 if the system is in operation. If the system is non-operational or the system power supply is unavailable, the electrical potential is battery 126. Upon receipt of the enable signal, enable device 128 directs current to destruct feature 125 thereby programming the destruct feature 125. In a particular embodiment, destruct feature 125 may be a fuse, one time programmable logic device, or the like. The programming of the destruct feature 125 results in zeroization of area(s) of the one or more crypto components 124 where sensitive data is stored, disables the crypto component 124, etc.

Figure 9:
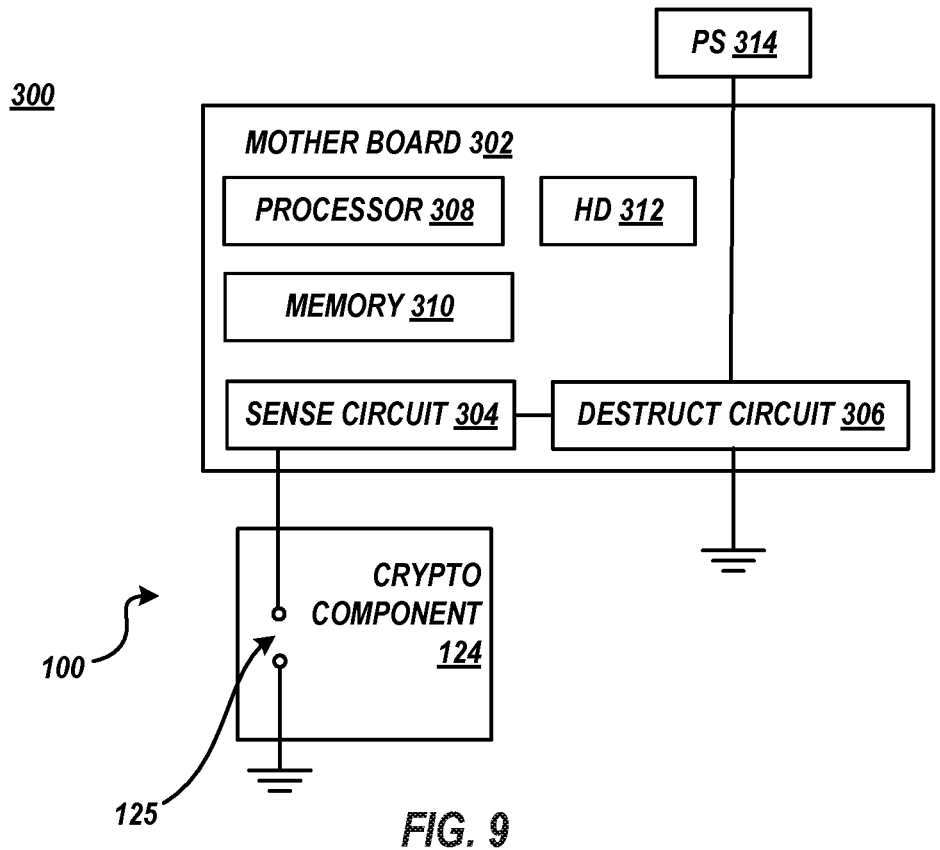
FIG. 9 illustrates of block diagram of a computer including a secure crypto module that utilizes various embodiments of the present invention.

FIG. 9 illustrates of block diagram of a computer 300 including a cryptographic adapter card 100 that utilizes various embodiments of the present invention. In addition to computer devices such as memory 310, processor 308, etc., the computer motherboard 302 also includes a sense circuit 304 and a destruct circuit 306. The sense circuit 304 senses, monitors, or otherwise detects that destruct feature 125 has been programmed within one or more crypto components 124. Destruct circuit 306 is connected to a power supply 314, such as the power supply of computer 300. Upon sense circuit 304 determining destruct feature 125 within one or more crypto components 124 has been programmed, destruct circuit 306 zeros area(s) of the computer 300 where sensitive data is stored (e.g., a hard drive 312, memory 310, etc.) and one or more functions of the computer 300 are permanently disabled. For example, the processor 308 or memory 310 may be disabled; an application program interface associated with crypto functions of secure crypto module 106 may be disabled, a data bus for communicating data between the processor 308 and the cryptographic adapter card 100 may be disabled, etc.

Figure 10:
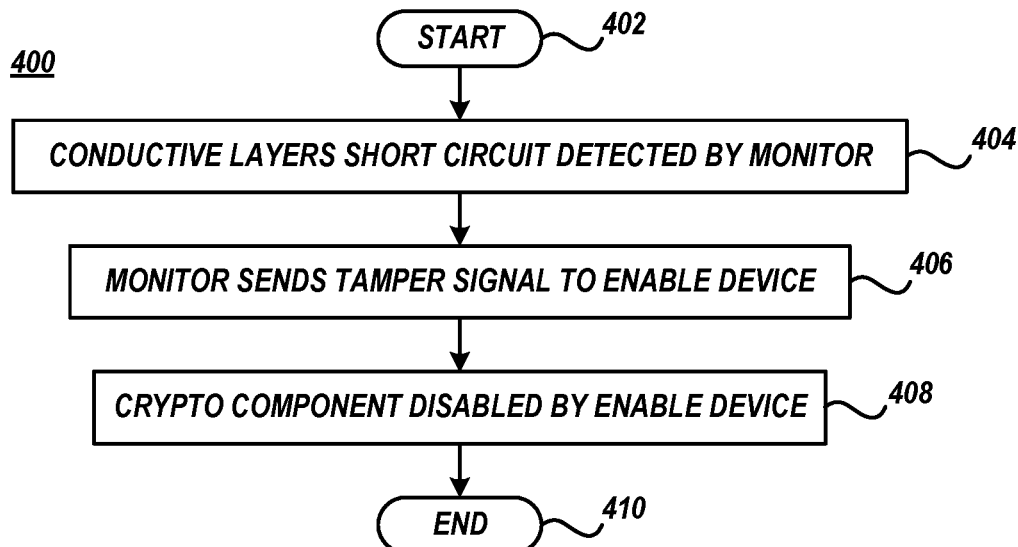
FIG. 10 and FIG. 11 illustrate exemplary methods of detecting and responding to an unauthorized attempt of physical access, according to various embodiments of the present invention.

FIG. 10 illustrates an exemplary method 400 of detecting and responding to an unauthorized attempt of physical access, according to various embodiments of the present invention. Method 400 may be utilized by a cryptographic adapter card 100 that includes a secure crypto module 106, a crypto component 124, a monitor device 130, security matrix layer 206, conductive shorting layer 204, and conductive shorting layer 208.

Method 400 begins at block 402 and continues by monitor device 130 detecting that conductive shorting layer 204 has become electrically connected with or shorted to conductive shorting layer 208 (block 404) which indicates that security matrix layer 206 has been accessed and electrically conductive material 230 has been formed from the accessed security matrix layer 206 shorting conductive shorting layer 204 with conductive shorting layer 208.

Method 400 may continue with the monitor device 130 sending a tamper signal to enable device 128 (block 406). For example, the monitor device 130 sends a high "1" tamper or enable signal to enable device 128 to generally instruct enable device 128 to program a destruct feature 125 within crypto component 124.

Method 400 may continue with crypto component 124 being disabled by the enable device 128 (block 408). For example, the programming of destruct feature 125 results in zeroization of area(s) of the one or more crypto components 124 where sensitive data is stored, renders the crypto component 124 inoperable, causes the crypto component 124 to perform spoof functions, causes the crypto component 124 to perform self-destruct functions, the activating of a tamper bit/byte within a crypto component 124 register, etc. Method 400 ends at block 410.

Figure 11:
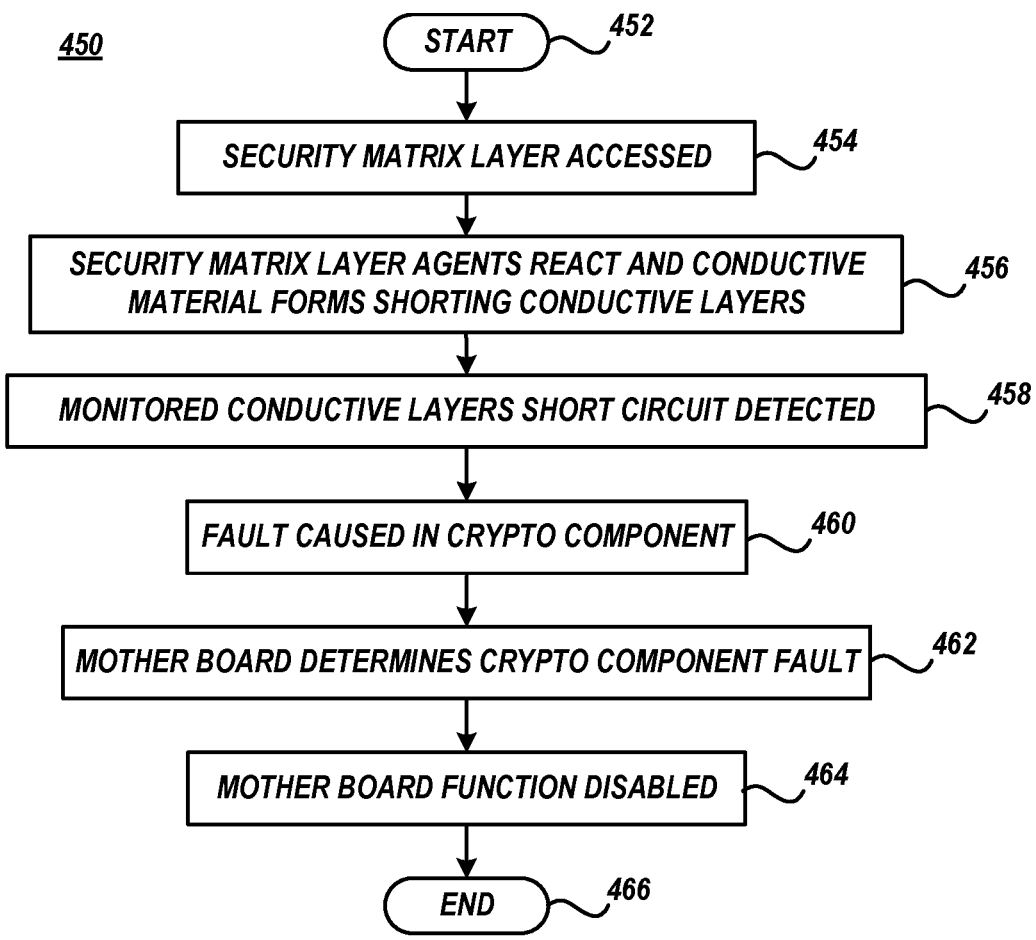

FIG. 11 illustrates an exemplary method 450 of detecting and responding to an unauthorized attempt of physical access, according to various embodiments of the present invention. Method 450 may be utilized by a computer 300 that includes a motherboard 302 that includes a sense circuit 304, and a destruct circuit 306, and a cryptographic adapter card 100 connected thereto. The cryptographic adapter card 100 includes a secure crypto module 106, a crypto component 124, a monitor device 130, a security matrix layer 206, a conductive shorting layer 204, and a conductive shorting layer 208.

Method 450 begins at block 452 and continues with the security matrix layer 206 being accessed (block 454). For example, a hole 220 is formed within security matrix layer 206, within conductive shorting layer 208, and at least partially within conductive shorting layer 204 by an unauthorized physical access thereof. For example, a hole 220 of 0.004 inches in diameter penetrates the entire conductive shorting layer 208, penetrates the entire security matrix layer 206, and penetrates the top surface of conductive shorting layer 204. For clarity, the hole 220 may have a diameter less than or greater than the referenced 0.004 inches.

Method 450 may continue with security matrix layer 206 reactants react resulting in conductive material 230 being released from surfaces of security matrix layer 206 exposed by the physical access thereof such that the conductive material 230 electrically shorts conductive shorting layer 208 with conductive shorting layer 204. (block 456).

Method 450 may continue with monitor device 130 detecting the short between conductive shorting layer 208 and conductive shorting layer 204 (block 458) which indicates that security matrix layer 206 has been accessed resulting in the formation of electrically conductive material 230.

Method 450 may continue with causing a fault in crypto component 124 (block 460). The fault is generally the result of the programming of destruct feature 125 within crypto component 124. For example, the fault of crypto component 124 may result in zeroization of area(s) of the one or more crypto components 124 where sensitive data is stored, renders the crypto component 124 inoperable, causes the crypto component 124 to perform spoof functions, causes the crypto component 124 to perform self-destruct functions, causes the activation of a tamper bit/byte within a crypto component 124 register, etc.

Method 450 may continue with motherboard 302 determining that the crypto component 124 has faulted (block 462). The motherboard 302 sense circuit 304 determines, monitors, or otherwise detects that destruct feature 125 has been programmed causing the fault of crypto component 124.

Method 450 may continue with disabling functionality provided by motherboard 302 (block 464). The disabling of functionality is generally the result of detecting the programming of destruct feature 125 within crypto component 124. For example, the fault of crypto component 124 may result in zeroization of area(s) of memory 310, processor 308, hard drive 312, etc. where sensitive data is stored, renders the memory 310, processor 308, etc. inoperable, causes the memory 310, processor 308, etc. to perform spoof functions, causes the memory 310, processor 308, etc. to perform self-destruct functions, etc. Method 450 ends at block 466.

Figure 12:
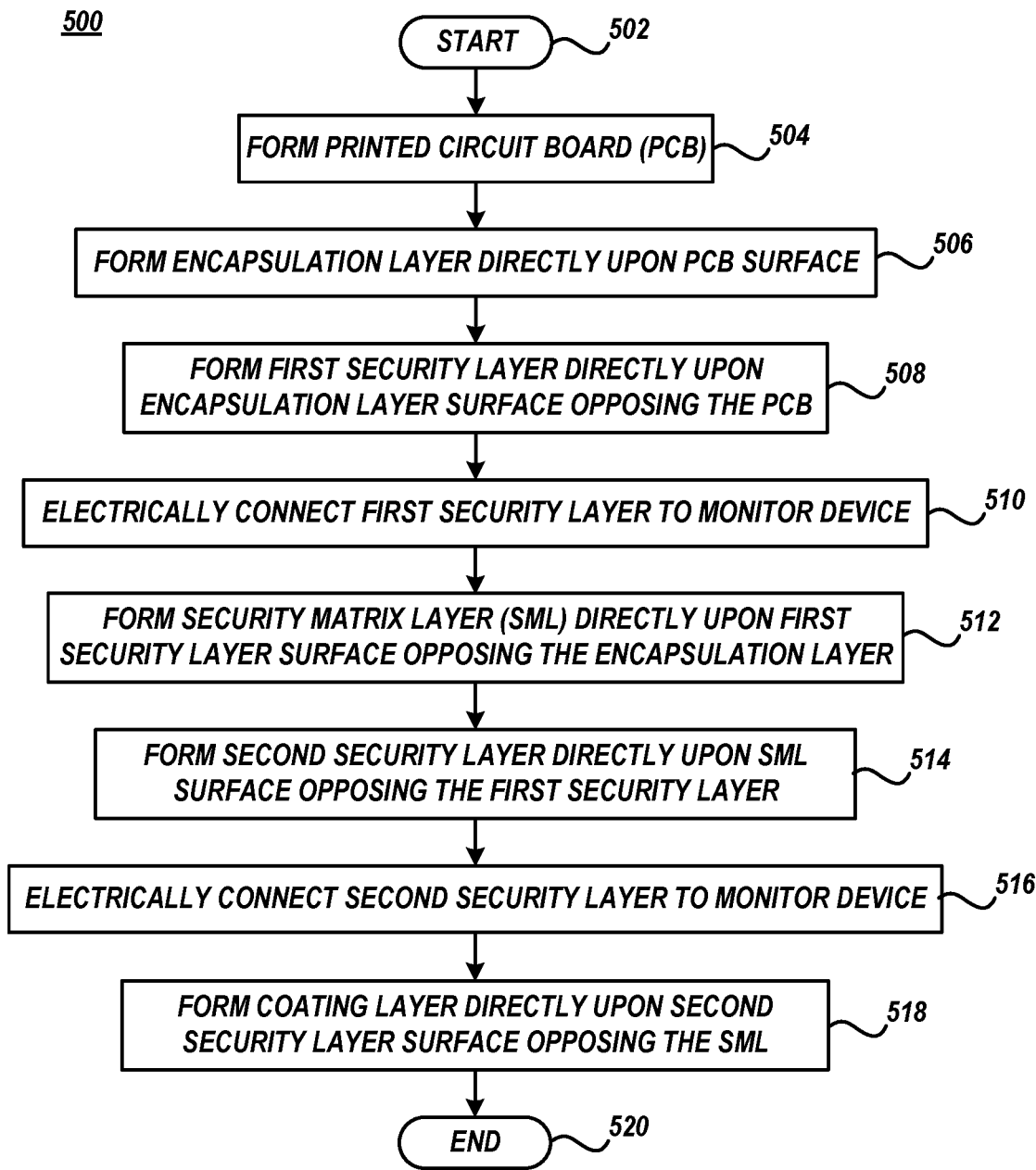
FIG. 12 illustrates an exemplary method of fabricating a cryptographic adapter card PCB or daughter PCB including a security matrix layer and conductive shorting layers, according to various embodiments of the present invention.

FIG. 12 illustrates an exemplary method 500 of fabricating a circuit board including a security matrix layer 206, a conductive shorting layer 204, and a conductive shorting layer 208. Method 500 may be utilized to fabricate adapter PCB 102 and/or daughter PCB 122.

Method 500 begins at block 502 and continues with forming or otherwise obtaining a printed circuit board (PCB) which includes one or more wiring layer(s) 200 (block 504). Method 500 may continue with forming encapsulation layer 202 directly upon the PCB (block 506). Method 500 may continue with forming conductive shorting layer 204 directly upon encapsulation layer 202 (block 508).

Method 500 may continue with electrically connecting conductive shorting layer 204 with monitor device 130 (block 510). For example, a wire, solder, etc. may connect conductive shorting layer 204 with monitor device 130. In another example, a plated through hole via previously formed through the encapsulation layer 202 and into the PCB may electrically connect with a particular trace within the PCB that is electrically connected to the monitor device 130. The formation of the conductive shorting layer 204 upon encapsulation layer 202 contacts and electrically connects the plated through hole via with conductive shorting layer 204. Conductive shorting layer 204 may be electrically connected with monitor device 130 by other known connection techniques.

Method 500 may continue with forming security matrix layer 206 directly upon the conductive shorting layer 204 (block 512). The security matrix layer 206 includes first microcapsules including a first reactant and second microcapsules including a second reactant. Numerous first and second microcapsules are randomly located within the security matrix layer 206, dispersed within the security matrix layer 206, randomly positioned in a three dimensional matrix within the security matrix layer 206, etc.

Method 500 may continue with forming conductive shorting layer 208 directly upon security matrix layer 206 (block 514). Method 500 may continue with electrically connecting conductive shorting layer 208 with monitor device 130 (block 516). Conductive shorting layer 208 may be electrically connected with monitor device 130 by known connection techniques. Method 500 may continue with forming coating layer 210 directly upon conductive shorting layer 208 (block 518). Method 500 ends at block 520.

Embodiments of the present invention may be a system, a method, and/or a computer program product. The computer program product may include a computer readable storage medium (or media) having computer readable program instructions thereon for causing a processor to carry out aspects of the present invention. The computer readable storage medium is a tangible device that can retain and store instructions for use by an instruction execution device. The computer readable storage medium may be, for example, but is not limited to, an electronic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A printed circuit board (PCB) comprising:
a first conductive layer and a second conductive layer;
a security matrix layer between the first conductive layer and the second conductive layer, the security matrix layer comprising first microcapsules that include therein a first reactant and second microcapsules that include therein a second reactant different than the first reactant;
an access void entirely through the first conductive layer, entirely through the security matrix layer, and at least partially through the second conductive layer, the access void rupturing one or more of the first microcapsules and rupturing one or more of the second microcapsules;
an electrically conductive material formed by the first reactant chemically reacting with the second reactant, wherein the electrically conductive material is directly upon a sidewall of the access void and electrically shorts the first conductive layer and the second conductive layer.

2. The PCB of claim 1, further comprising:
a crypto component; and
a monitor device electrically connected to the first conductive layer and to the second conductive layer.

3. The PCB of claim 2, wherein a destruct feature of the crypto component is programmed in response to the monitor device detecting the electrical short between the first conductive layer and the second conductive layer.

4. The PCB of claim 1, wherein the first reactant is an aldehyde.

5. The PCB of claim 1, wherein the second reactant is an Tollens' reagent.

6. The PCB of claim 1, wherein the electrically conductive material is metallic silver.

7. A data handling electronic device comprising:
a first conductive layer and a second conductive layer;
a security matrix layer between the first conductive layer and the second conductive layer, the security matrix layer comprising first microcapsules that include therein a first reactant and second microcapsules that include therein a second reactant different than the first reactant;
an access void entirely through the first conductive layer, entirely through the security matrix layer, and at least partially through the second conductive layer, the access void rupturing one or more of the first microcapsules and rupturing one or more of the second microcapsules;
an electrically conductive material formed by the first reactant chemically reacting with the second reactant, wherein the electrically conductive material is directly upon a sidewall of the access void and electrically shorts the first conductive layer and the second conductive layer.

8. The data handling electronic device of claim 7, further comprising:
a crypto component; and
a monitor device electrically connected to the first conductive layer and to the second conductive layer.

9. The data handling electronic device of claim 8, wherein a destruct feature of the crypto component is programmed in response to the monitor device detecting the electrical short between the first conductive layer and the second conductive layer.

10. The data handling electronic device of claim 7, wherein the first reactant is an aldehyde.

11. The data handling electronic device of claim 7, wherein the second reactant is an Tollens' reagent.

12. The data handling electronic device of claim 7, wherein the electrically conductive material is metallic silver.

* * * * *